United States Patent
Coltro

(10) Patent No.: US 6,950,392 B2
(45) Date of Patent: *Sep. 27, 2005

(54) FIBER OPTIC SYNCHRONOUS DIGITAL HIERARCHY TELECOMMUNICATION NETWORK PROVIDED WITH A PROTECTION SYSTEM SHARED ON THE NETWORK

(75) Inventor: Claudio Coltro, Milan (IT)

(73) Assignee: Alcatel, Paris (FR)

( * ) Notice: Subject to any disclaimer, the term of this patent is extended or adjusted under 35 U.S.C. 154(b) by 209 days.

This patent is subject to a terminal disclaimer.

(21) Appl. No.: 10/180,344

(22) Filed: Jun. 27, 2002

(65) Prior Publication Data

US 2002/0167966 A1 Nov. 14, 2002

Related U.S. Application Data

(63) Continuation of application No. 09/074,812, filed on May 8, 1998, now Pat. No. 6,421,318.

(30) Foreign Application Priority Data

May 16, 1997 (IT) .......................................... MI97A1144

(51) Int. Cl.⁷ .................................................. H04J 1/16
(52) U.S. Cl. ....................................................... 370/223
(58) Field of Search .............................. 370/216, 389, 370/395.1, 351, 352, 229, 217, 222, 223, 224, 227, 228, 461, 462, 403, 404, 405, 406; 340/825.01; 379/221, 139, 115, 120, 127, 135; 398/43, 58, 56, 82, 118, 110

(56) References Cited

U.S. PATENT DOCUMENTS 5,179,548 A 1/1993 Snnderasa 5,442,623 A 8/1995 Vu
6,421,318 B1 * 7/2002 Coltro ........................ 370/223

OTHER PUBLICATIONS

ITU–T G.803: Series G: Transmission Systems and Media, Digital Systems and Networks, Architecture of Transport networks Based on the Synchronous Digital Hierarchy (SDH), Jun. 1997.

ITU–T G.841: General Aspects of Digital Transmission Systems, "Types and Characteristics of SDH Network Protection Architectures" Apr. 1995.

ITU–T G.707: General Aspects of Digital Transmission Systems, "Network Node Interface for the Synchronous Digital Hierarchy (SDH)" Nov. 1995.

ITU–T G.872, Types and General Characteristics of Synchronous Digital Hierarchy (SDH) Equipment Sep. 1993.

ITU–G.783, "Characteristics of Synchronous Digital Hierarchy (SDH) Equipment Functional Blocks", Sep. 1993.

* cited by examiner

Primary Examiner—Dang T Ton
(74) Attorney, Agent, or Firm—Sughrue Mion, PLLC

(57) ABSTRACT

A fiber optic synchronous digital hierarchy telecommunication network provided with a protection system shared on the network is described, which comprises spans of pairs of optical fibers (N×2F) having network elements (N×2F-SDHNE) interposed therebetween, wherein the spares of pairs of optical fibers have a variable number N (N=1, 2, 3, . . . ) of pairs, and the network elements (N×2F-SDHNE) feature variable interconnection capability between said spans, so that several spans having number N of pairs of optical fiber even different can be connected to at least some of said network elements.

41 Claims, 3 Drawing Sheets

FIG. 1.1
PRIOR ART
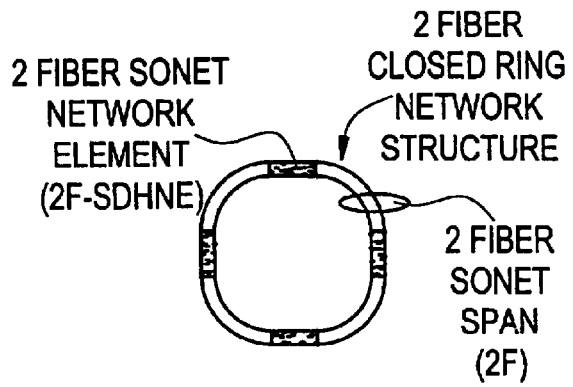
FIG. 1.2
PRIOR ART
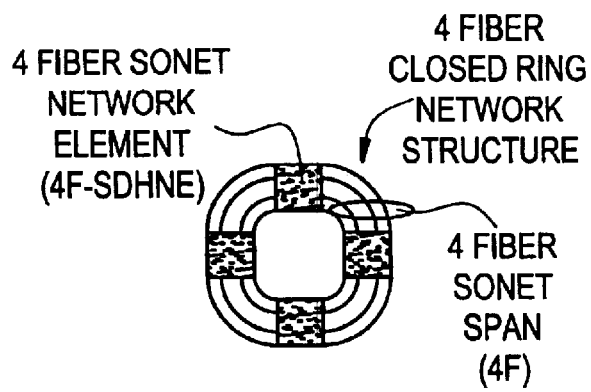
FIG. 2.1
PRIOR ART
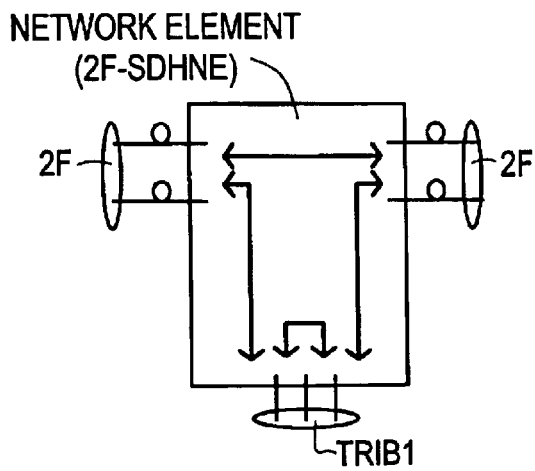
FIG. 2.2
PRIOR ART
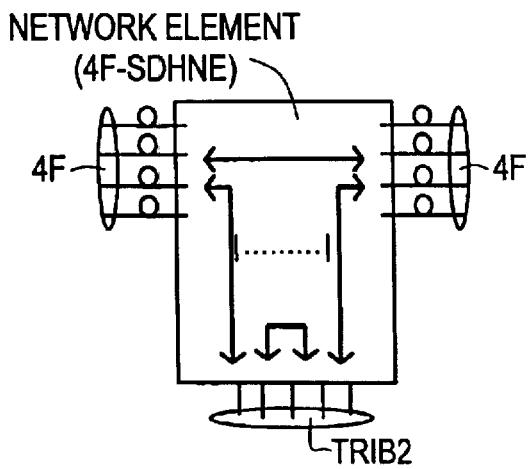

FIBER OPTIC SYNCHRONOUS DIGITAL HIERARCHY TELECOMMUNICATION NETWORK PROVIDED WITH A PROTECTION SYSTEM SHARED ON THE NETWORK

This is a continuation of application Ser. No. 09/074,812 filed May 8, 1998, now U.S. Pat. No. 6,421,318; the disclosure of which is incorporated herein by reference.

The present invention relates to the field of the synchronous hierarchy telecommunication network and more precisely to improvements in a fiber optic SDH telecommunication network provided with a protection system shared on the network, comprising fiber optic spans with network elements interposed therebetween in which every network element is connected to an adjacent elements through said fiber spans allowing a bidirectional communication between the elements.

The structure of the fiber optic SDH (Synchronous Digital Hierarchy) telecommunication networks, as well as the transmission protocols, are substantially known and subjected to international standardization activity.

The International Telecommunication Union (ITU-T) issued a set of Recommendations (series G.7nn and G.8nn, in particular G.707, G.782, G.783, G.803, G.841) relative to said SDH network structure giving a full description thereof, to such a level that a person skilled in the art is able to get all information required for the implementation thereof, as a not limiting example, the ITU-T Recommendation G.707 entitled "General Aspects of Digital Transmission Systems-Network node Interface for the Synchronous Digital Hierarchy (SDH)", November 1995.

In the field of fiber optic SDH transmission networks, systems for protecting from line interruptions of the type shared on the network itself are generally known with the acronym MS-SPRING (Multiplex Section-Shared Protected RING), described e.g. in the ITU-T Recommendation G.841 entitled: "General Aspects of Digital Transmission Systems-Types and characteristics of SDH Network Protection Architectures", April 1995. In said Recommendation G.841 there are described the MS-SPRING networks having two-fiber spans (2F-MS-SPRING) or four-fiber ones (4F-MS-SPRING).

As evidenced in FIGS. 1.1 and 1.2, the known two- and four-fiber architectures are composed of two-fiber (2F) spans or four-fiber (4F) spans respectively, having nodal points, 2F-SDHNE or 4F-SDHNE respectively, interposed therebetween and formed essentially of known multiplexing/switching matrices, as described in Recommendation G.841.

Due to the type of traffic in said transmission network that is generally hubbed or dual hubbed with a small component of uniform traffic, fixed ring structures like 2F-MS-SPRING and 4F-MS-SPRING are not flexible enough to adapt the traffic requirements in the network.

From the traffic distribution analysis in the metropolitan regional and national network, it has been observed that said networks are mainly made of few nodes with high traffic capabilities (for large capital cities or large suburbs and business centers) and, on the other hand, a majority of nodes with small traffic access capabilities, located in the city or small suburbs.

It has been observed that traffic models in real networks require a multiplicity of nodes with limited traffic access capabilities and, on the contrary, a very small number of nodes require very high traffic access capabilities; this amounts to saying that the mean flows of traffic go from small nodes to large nodes.

If one wishes to realize such networks by using the known structures 2F-MS-SPRINGs or 4F-MS-SPRINGs, it is seen that, apart from the traffic access in each of the nodes, the amount of high speed interconnecting ports required to interconnect the nodes is the same and it is too high. This results in large expenditures in installation and equipment costs.

Moreover, in the case of multiple interruptions in the fiber optic spans or optical interfaces, the known network structures do not provide enough protection level, since they do not assure a suitable reset capability.

Accordingly, it is an object of the present invention to overcome all the aforesaid drawbacks and to indicate a new topology of fiber optic SDH telecommunication networks provided with a protection system shared on the network, in which nodes with very high traffic access capabilities and nodes with smaller traffic access capabilities coexist.

Large nodes will require a higher number of optical ports and interconnection fibers, whilst smaller nodes will require a smaller amount of optical ports and fiber interconnections.

Hence, network elements and nodes with capability N×2FMS SPRINGs will coexist in the same network, N being variable. Typically N will be 1 or 2 but greater values may exist as well. Therefore, in the same network, network elements with 2-fiber connections for small nodes, network elements with 2×2-fiber connections for medium sized nodes and network elements with N×2-fiber connections for larger nodes, will coexist.

N×2F nodes (N=>2) will be required to support a full cross-connection of traffic between high-speed optical ports and between high-speed ports and low-speed ports.

In order to achieve these objectives, the present invention has for its subject matter improvements in a fiber-optic SDH telecommunication network provided with a protection system shared on the network, comprising fiber optic spans with network elements interposed therebetween, in which every network element is connected with adjacent elements through said fiber spans allowing a bidirectional communication between the elements, characterized in that said fiber optic spans are spans of pairs of fibers having a variable number N (N=1, 2, 3, . . . ) of pairs, wherein each pair is independent from the others, and in that said network elements are network elements with variable interconnection capability between said spans of pairs of fibers so that connectable to at least some of said elements are several spans having even different numbers N of pairs of optical fibers.

Further embodiments of the present invention are set fourth in the dependent claims.

The network of the invention has the basic advantage of a remarkable cost reduction as compared with the known solutions type 4F-MS-SPRING. This is due to substantial reduction in high-speed SDH optical interfaces required for interconnecting the nodes. This results in significant saving in installation, equipment and spare parts expenditures.

Another important advantage of the network subject matter of the present invention is the provision of protection in the case of multiple interruptions occuring in different spans of the network, since the N×2F nodes act as N independent protection systems, capable of assuring protection against N simultaneous interruptions, which are handled independently, thus assuring higher traffic capabilities in case of failure.

Another advantage is an increase in the network flexibility in function of envisaged variations of the traffic demand, since the grow steps of the N×2F-MS-SPRING network are in terms of two-fiber sub-networks and not of four-fiber sub-networks as in the known 4F-MS-SPRING networks.

Further objects and advantages of the present invention will result better from the following detailed description of an embodiment thereof and from the drawings attached merely by way of a not limiting example, in which:

FIGS. 1.1 and 1.2 show known two- and four-fiber network structures respectively;

FIGS. 2.1 and 2.2 show block diagrams of the 2F-SDHNE and 4F-SDHNE network elements of FIGS. 1.1 and 1.2 respectively;

Figure 3:
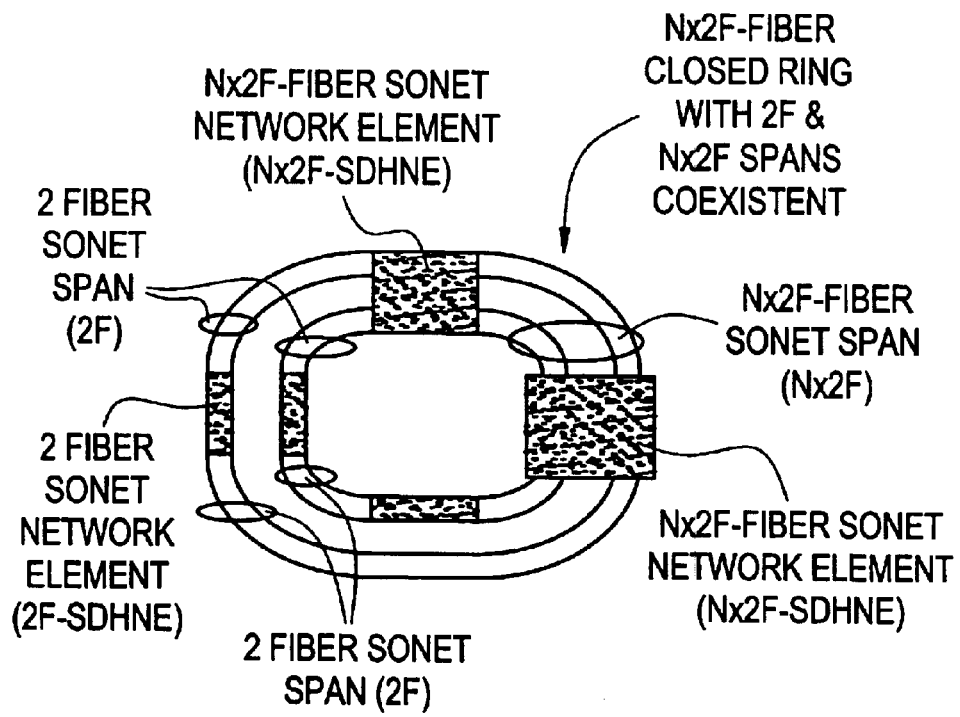
FIG. 3 shows the new network structure according to the invention.

FIGS. 1.1 and 1.2 illustrate conventional two- and four-fiber network structures respectively. They comprise two-fiber optic spans 2F (FIG. 1.1) and four-fiber optic spans 4F (FIG. 1.2) with nodal points interposed therebetween, in the following termed as 2F-SDHNE and 4F-SDHNE network elements respectively, whose structure is standardized and described for instance in the ITU-T Recommendations G.707 and G.841.

Said network structures form closed rings in which every network element is connected to two adjacent elements through fiber optic spans allowing a bidirectional communication (duplex) between the elements. The ring provides such a redundancy level, both in bandwidth and in forming parts, that it can be reconfigured, in case of failure, in such a way as to support anyway a certain traffic level also in a degraded configuration.

FIGS. 2.1 and 2.2 illustrate block diagrams of the network elements 2F-SDHNE and 4F-SDHNE of FIGS. 1.1 and 1.2 respectively. They are formed essentially of known multiplexing/switching matrices realizing cross-connection capabilities between the various input/output ports of the SDH network element, not shown in the figures. The bidirectional arrows inside the network elements indicate the types of cross-connection thus realized: connection between high speed ports for data flows belonging to the same 2F or 4F fiber span, and connections between said high speed ports and local ports TRIB1 and TRIB2 for data traffic at lower bitrate.

Data flows can transit through the 2F, 4F fiber optic spans at high bit rate, e.g. 2.5 Gbit/s or even 10 Gbit/s, and over the local ports TRIB1 and TRIB2 local flows can transit at variable bit rate, e.g. from 2 Mbit/s up to 2.5 Mbit/s. The data flow structure is known and defined in the various ITU-T Recommendations. The MS-SPRING network structure, both in the 2F and 4F cases, sees every span as unitary and carries both working channels that must be protected, and protection channels of the working traffic. The protection channels are mainly used for replacing the working channels in case of failure in the network, otherwise they are used also for transporting working traffic as extra-capability under normal condition. The extra-capability is nullified in case of failure that requires the use of protection channels for replacing the working channels.

Following the minimum distance paths between two terminal points, in the 2F case, one fiber of the span carries working channels and protection channels in one direction, the other fiber in the opposite direction, whilst in the 4F case, two fibers in a span carry working channels one in one direction, the other in the opposite direction, and the other two carry protection channels, one in one direction and the other in the opposite direction.

In both 2F and 4F configurations in case of failure leading to the break of a fiber in a span, the working traffic of even only one of the two directions can be routed again over the protection channel of the other fiber in the opposite direction of the same span following the longest path on the remainder of the ring, but avoiding the loss of connection. In the case of break of all fibers in the span, the working traffic is routed again over the protection channels of the adjacent span in the opposite direction.

It is not deemed it necessary to provide further description of said structures, as well as of signals transiting therein, since they are known to those skilled in the art.

In accordance with the present invention, the structures of FIGS. 1.1 and 1.2 are modified as evidenced by FIG. 3, where the network structure allows the coexistence of network elements and nodes with capability of N×2F MS-SPRINGs, N being variable.

In FIG. 3, 2F indicates spans of pairs of fibers as those shown in FIG. 1.1 and 2F-SDHNE indicates network elements of the type shown in FIG. 1.1.

N×2F-SDHNE indicates network elements modified in accordance with the present invention, to allow said coexistence. N×2F indicates a span with N pairs of fibers, where N=2, 3, . . . .

In the general case, every span is then considered as comprising N independent pairs of fibers, and therefore it is seen as N different spans contrasting with the known structures.

Figure 4:
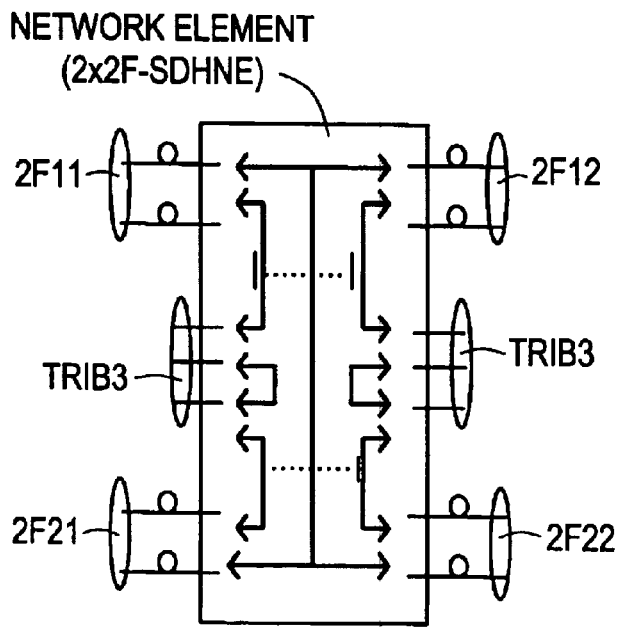
FIG. 4 shows a first embodiment of the N×2F-SDHNE network element of FIG. 3.

FIG. 4 shows a first not limiting example of how the structures of FIGS. 2.1 and 2.2 can be modified in accordance with the present invention to obtain N×2F-SDHNE network elements, i.e. 2×2F-SDHNE when N=2.

A 2×2F-SDHNE network element is formed essentially of a known multiplexing/switching matrix type ADM (Add-Drop Multiplex) which realized a non-blocking cross-connect capability between the various access ports of the network element not shown in the figure for simplicity, has they are also known.

The bidirectional arrows inside 2×2F-SDHNE indicate the following types of non-blocking cross-connections thus realized:

cross-connection between ports for high bit rate data flows belonging to fiber of the same pair (2F11 . . . 2F22) or different pairs of the same span (2F11 with 2F21, 2F12 with 2F22);

cross-connection between ports for high bit rate data flows belonging to pairs of different fiber of different spans: 2F11 with 2F12 or with 2F22; 2F22 with 2F11 or with 2F21, and so on;

connections between said high speed ports 2Fnn with local ports TRIB3 for lower bit rate data traffic.

From the above functional description a person skilled in the art is able to realize the network element, also taking into account what described with reference to the above known structures. The dimensioning of the network element depends upon the size of the flows to be routed, in accordance with information frame structures defined e.g. in the ITU-T Recommendation G.707.

The cross-connect functionality thus realized is, therefore, such as to connect in a bidirectional non-blocking way the ports of 2F line spans with the local flow ports TRIB3, and the ports of the line spans to each other according to all the possible combinations.

In case of failure in the span, for instance 2F11, the network element is able to switch the data flows on span 2F21 or 2F22, this realizing a sort of re-routing of flows from different spans which was not possible to realize with the known systems described above.

Therefore, it is possible to configure a four-fiber high speed span preferably as composed of two known independent spans of pairs of fibers 2F, thanks to the new configuration according to the invention which allows a cross-connection between ports for high bit-rate data flows belonging to different fiber spans. This was not possible in the known systems. But it is always possible to configure the span as a known 4F span.

Figure 5:
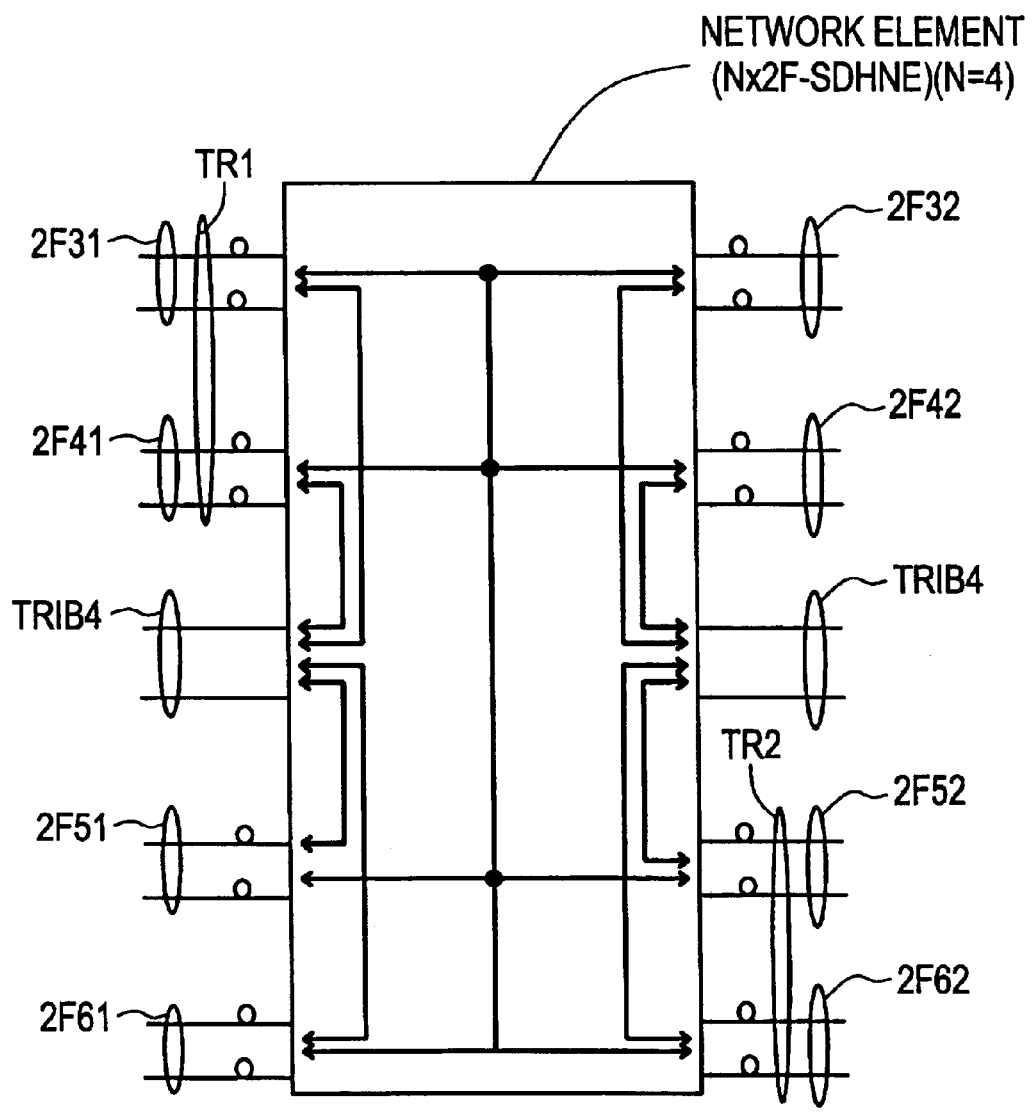
FIG. 5 shows a second embodiment of the N×2F-SDHNE network element of FIG. 3.

FIG. 5 shows a second not limiting example of how the structures of FIGS. 2.1 and 2.2 can be modified in accordance with the present invention to obtain N×2F-SDHNE network elements, when N>2. More specifically, the not limiting case N=4 is contemplated here.

An N×2F-SDHNE network element is formed essentially of a system called Digital Cross Connect (DXC) known per se, which realizes a non-blocking cross-connection capability among the various access ports of the network element itself, not illustrated in the figure, as they are also known.

The bidirectional arrows inside N×2F-SDHNE indicate the following types of non blocking cross-connection thus realized:
  cross-connection between ports for high bit rate data flows belonging to fibers of the same pair (2F31, 2F32, ... 2F61, 2F62) or different pairs of the same span (e.g. 2F31 with 2F41 of span TR1, or 2F52 with 2F62 of span TR2);
  cross-connection between ports of high bit rate data flows belonging to different pairs of fibers of different spans, from anyone towards another one of these (e.g. 2F61 with 2F41, or 2F52 with 2F32);
  connections between said high speed ports 2F31, ... 2F62 with local ports TRIB4 for local data flows at lower bit rate.

From the above functional description, a person skilled in the art is able to realize the Digital Cross Connect (DXC) system, taking also into account what has been described in connection with the above known structures. The dimensioning of the network element depends on the dimension of the flows to be routed, in accordance with the structures of the information frames defined e.g. in the ITU-T Recommendation G.707.

The cross-connection functionality thus realized, therefore, is such as to connect in a non-blocking bidirectional way the port of high speed line spans 2F with the local flow ports TRIB3, and the line span ports to each other according to all the possible combinations.

In case of failure in a span, e.g. 2F5, the N×2F-SDHNE network element is able to switch the given flows on another span, e.g. 2F7, thus realizing a sort of re-routing of flows from different spans which was not possible to realize with the known system, even complex, described above.

Therefore, also in this case it is possible to configure a high speed span provided with a number N of pairs of fibers preferably composed of N independent connectional spans of pairs of fiber 2F, thanks to the new configuration according to the invention, which allows a cross-connection between ports for high bit rate data flows belonging to different fiber spans.

This was not possible in conventional systems.

What is claimed is:

1. A fiber optic digital synchronous network, including network elements comprising optical interfaces for receiving optical fibers, and fiber optic spans interposed between the network elements to form a ring, each network element being connected to adjacent network elements through said fiber optic spans allowing bidirectional communication therebetween;
  wherein said fiber optic spans comprise:
    at least two spans having a first number of fiber pairs; and
    at least one span having a second number of fiber pairs, the second number being different from the first number;
  further wherein said network elements comprise:
    at least one network element interposed between spans having said first number of fiber pairs; and
    at least one network element connected to a span having said second number of fiber pairs.

2. A network according to claim 1, wherein every network element realizes the following types of non-blocking connections:
  cross-connection between fibers either of the same pair or of different pairs of the same span;
  cross-connection between fibers of different spans, from any span towards any other span;
  connections between said pairs of fibers and local ports for local data flows at a lower than the bit rate between the network elements.

3. A network according to claim 1, wherein at least one of said network elements is an add-drop multiplexer.

4. A network according to claim 1, wherein at least one of said network elements is a digital cross-connect.

5. A synchronous optical ring network, comprising:
  a plurality of network elements; and
  plural fiber optic spans interposed between the network elements to form said ring, each network element being connected to adjacent network elements through said fiber optic spans allowing bidirectional communication therebetween with traffic protection shared on the ring network, wherein a non-blocking cross-connection is realized between fibers either of a same pair or of different pairs of a same span.

6. A synchronous optical ring network, comprising:
  a plurality of network elements; and
  plural fiber optic spans interposed between the network elements to form said ring, each network element being connected to adjacent network elements through said fiber optic spans allowing bidirectional communication therebetween with traffic protection, wherein a non-blocking cross-connection is realized between fibers or pairs of fibers of different spans from any span towards any other span.

7. A synchronous optical ring network, comprising:
  a plurality of network elements; and
  plural fiber optic spans, each of a plurality of pairs of fibers, interposed between the network elements to form said ring, each network element being connected to adjacent network elements through said fiber optic spans allowing bidirectional communication at a same bit rate therebetween with traffic protection, wherein non-blocking connections are makeable between said pairs of fibers and local ports for local data flows at a bit rate lower than said same bit rate between said network elements.

8. A network according to claim 1, wherein said fiber optic spans further comprise at least one span having a third number of fiber pairs, the third number being higher than the second number.

9. A network according to claim 1, further wherein said at least one network element that is connected to a span having said second number of fiber pairs is also connected to at least one span having said first number of fiber pairs.

10. A network according to claim 1, further wherein said at least one network element that is connected to a span having said second number of fiber pairs is also connected to a further span having said second number of fiber pairs.

11. A network according to claim 8, further wherein said network elements comprise at least one network element connected to a span having said third number of fiber pairs and to at least one span having said first number of fiber pairs.

12. A network according to claim 8, further wherein said network elements comprise at least one network element connected to a span having said third number of fiber pairs and to at least one span having said second number of fiber pairs.

13. A network according to claim 8, further wherein said network elements comprise at least one network element connected to a span having said third number of fiber pairs and to a span having said third number of fiber pairs.

14. A network according to claim 1, wherein said first number of fiber pairs is one and said second number of fiber pairs is two so as to have two fiber spans and four fiber spans, respectively.

15. A network according to claim 1, wherein said at least one network element that is connected to a span having said second number of fiber pairs provides for a cross-connection capability between fibers either of the same fiber pair or of different fiber pairs of the same span.

16. A network according to claim 1, wherein said at least one network element that is connected to a span having said second number of fiber pairs provides for a cross-connection capability between fibers of fiber pairs of different spans, namely a fiber pair of one span with a fiber pair of the other span.

17. A network according to claim 1, wherein said at least one network element that is connected to a span having said second number of fiber pairs provides for a connection capability between said pair of fibers and local ports for local data flows at a bit rate lower than the bit rate between the network elements.

18. A network element for use in a fiber optic synchronous digital network including network elements and fiber optic spans interconnecting the network elements to form a ring, said fiber optic spans including at least two spans having a first number of fiber pairs; and at least one span having a second number of fiber pairs, with the second number being higher than the first number; said network element realizing the following types of non-blocking connections:
cross-connection between fibers either of the same pair or of different pairs of the same span;
cross-connection between fibers of different spans, from any span towards any other span; connections between said pairs of fibers and local ports for local data flows at a bit rate lower than the bit rate between the network elements.

19. A network element for use in a synchronous optical ring network including a plurality of network elements and plural fiber optic spans interposed between the network elements to form said ring, each network element being connected to adjacent network elements through said fiber optic spans allowing bidirectional communication therebetween, said network element providing a non-blocking cross-connection between fibers either of a same pair or of different pairs of a same span.

20. A network element for use in a synchronous optical ring network including a plurality of network elements and plural fiber optic spans interposed between the network elements to form said ring, each network element being connected to adjacent network elements through said fiber optic spans allowing bidirectional communication therebetween, said network element providing a non-blocking cross-connection between fibers or pairs of fibers of different spans from any span towards any other span.

21. A network element for use in a synchronous optical ring network including a plurality of network elements and plural fiber optic spans, each of a plurality of pairs of fibers, interposed between the network elements to form said ring, each network element being connected-to adjacent network elements through said fiber optic spans allowing bidirectional communication at a same bit rate therebetween, said network element providing a non-blocking connection between said pairs fibers and local ports for local data flows at a bit rate lower than said same bit rate between said network elements.

22. A fiber optic digital network, comprising network elements and fiber optic spans interposed between the network elements to form a ring, each network element being connected to adjacent network elements through said fiber optic spans allowing bidirectional communication therebetween, wherein said fiber optic spans comprise at least two spans having a first number of fiber pairs and at least one span having a second number of fiber pairs, the second number being different from the first number, said network elements including a first network element interposed between spans of said ring having said first number of fiber pairs, and a second network element connected to a span of said ring having said second number of fiber pairs.

23. A method for making a fiber optic digital synchronous network, the method comprising the step of interposing fiber optic spans between network elements to form a ring, wherein said network elements comprise optical interfaces for receiving optical fibers and wherein each network element is connected to adjacent network elements through said fiber optic spans allowing bidirectional communication therebetween, wherein:
at least two of said spans have a first number of fiber pairs, and at least one of said spans has a second number of fiber pairs, the second number being different from the first number; and
said step of providing network elements comprises providing at least one network element interposed between spans having said first number of fiber pairs, and providing at least one network element connected to a span having said second number of fiber pairs.

24. A method according to claim 23, wherein the step of providing network elements comprises providing network elements realizing the following types of non-blocking connections:
cross-connection between fibers either of the same pair or of different pairs of the same span;
cross-connection between fibers of different spans, from any span towards any other span;
connections between said pairs of fibers and local ports for local data flows at a bit rate lower than the bit rate between the network elements.

25. A method according to claim 23, at least one of said network elements is an add-drop multiplexer.

26. A method according to claim 23, wherein at least one of said network elements is a digital cross-connect.

27. A method according to claim 23, wherein said fiber optic spans further comprise at least one span having a third number of fiber pairs, the third number being higher than the second number.

28. A method according to claim 23, further comprising connecting said at least one network element that is connected to a span having said second number of fiber pairs also to at least one span having said first number of fiber pairs.

29. A method according to claim 23, further comprising connecting said at least one network element that is connected to a span having said second number of fiber pairs also to a further span having said second number of fiber pairs.

30. A method according to claim 27, wherein said interposing step further comprises connecting at least one network element connected to a span having said third number of fiber pairs also to at least one span having said first number of fiber pairs.

31. A method according to claim 27, wherein said interposing step further comprises connecting at least one network element connected to a span having said third number of fiber pairs also to at least one span having said second number of fiber pairs.

32. A method according to claim 27, wherein said interposing step further comprises connecting at least one network element connected to a span having said third number of fiber pairs also to a span having said third number of fiber pairs.

33. A method according to claim 23, wherein said first number of fiber pairs is one and said second number of fiber pairs is two so as to have two fiber spans and four fiber spans, respectively.

34. A method according to claim 23, wherein said at least one network element that is connected to a span having said second number of fiber pairs provides for a cross-connection capability between fibers either of the same fiber pair or of different fiber pairs of the same span.

35. A method according to claim 23, wherein said at least one network element that is connected to a span having said second number of fiber pairs provides for a cross-connection capability between fibers of fiber pairs of different spans, namely a fiber pair of one span with a fiber pair of the other span.

36. A method according to claim 1, wherein said at least one network element that is connected to a span having said second number of fiber pairs provides for a connection capability between said pair of fibers and local ports for local data flows at a bit rate lower than the bit rate between the network elements.

37. A method for making a fiber optic digital synchronous network, the method comprising the step of interposing fiber optic spans between network elements to form a ring, wherein each network element is connected to adjacent network elements through said fiber optic spans allowing bidirectional communication therebetween, wherein:

said fiber optic spans comprise at least two spans having a first number of fiber pairs and at least one span having a second number of fiber pairs, the second number being different from the first number, and said interposing step comprises interposing a first network element between spans of said ring having said first number of fiber pairs, and connecting a second network element to a span of said ring having said second number of fiber pairs.

38. A network according to claim 1, wherein said second number is higher than said first number.

39. A network according to claim 2, wherein said second number is higher than said first number.

40. A method according to claim 23, wherein said second number is higher than said first number.

41. A method according to claim 37, wherein said second number is higher than said first number.

* * * * *